United States Patent [19]

Schilder

[11] 4,145,954
[45] Mar. 27, 1979

[54] CONTAINER CLEANING APPARATUS

[75] Inventor: Petrus J. Schilder, Roden, Netherlands

[73] Assignee: Zeevenhooven B.V., Roden, Netherlands

[21] Appl. No.: 678,855

[22] Filed: Apr. 21, 1976

[51] Int. Cl.² .......................... B23C 3/00; B23C 39/02
[52] U.S. Cl. ........................................ 90/11 C; 90/20; 15/104.1 C
[58] Field of Search ........ 90/11 C, 20, 11 R, DIG. 1; 299/87, 90; 15/104.09, 104.1

[56] References Cited

U.S. PATENT DOCUMENTS

| | | | |
|---|---|---|---|
| 2,740,331 | 4/1956 | Schwartz et al. | 90/20 |
| 2,911,662 | 11/1959 | Sedgwick | 15/104.1 |
| 2,963,725 | 12/1960 | Bredtschneider | 90/20 |
| 3,543,635 | 12/1970 | Galbarini et al. | 90/11 R |
| 3,647,265 | 3/1972 | Pentith | 299/90 |
| 3,847,439 | 11/1974 | Allen | 299/87 X |

Primary Examiner—Othell M. Simpson
Assistant Examiner—Z. R. Balinsky
Attorney, Agent, or Firm—Irvin A. Lavine

[57] ABSTRACT

A method and apparatus for cleaning hollow bodies, in particular removing scale, incrustations and suchlike deposits from the inner wall of a vessel or a tube. The deposits are removed by a milling or boring operation.

2 Claims, 6 Drawing Figures

CONTAINER CLEANING APPARATUS

The present invention relates to a method of cleaning hollow bodies, in particular removing scale, incrustations and suchlike deposits from the inner wall of a vessel or a tube.

In metallurgical industries, for example, use is made of casting ladles having a lining of ceramic material. After some time a slag layer deposits on said lining, while it is no infrequent occurrence that metal burns in locally. For removing this encrusted material use has so far been made of a pneumatically driven spudding bit. In the first place this method is time-consuming, while moreover, in case the bit encounters a hard metal part, it may glance off same and penetrate into the relatively soft refractory material.

The object of the invention is to avoid these drawbacks.

To this end, according to the invention, the deposits are removed by a milling or boring operation. In this way it is possible to remove slag deposits etc. in an accurately controlled way and independent of local differences in hardness, while moreover the noise inherent in using pneumatic tools is avoided. Besides it is possible to choose relatively inexpensive refractory material for the linings of casting ladles, as it need not be resistant to hammering.

To remove deposits such as slag and metal parts adhering to the refractory lining of a metal casting ladle, it is possible, according to the invention, to rotate the casting ladle about its axis and bring a cutter head into contact with the inner wall thereof. For example, the casting ladle can be rotated while being in horizontal position, supported by support rollers, and can moreover be kept in position by arresting rollers. Use can be made of a cylindrical cutter head having a diameter smaller than the inner diameter of the casting ladle to be cleaned, the cutter head being rotated opposite to the direction of rotation of the casting ladle. By effecting a relative axial movement between the rotary casting ladle and the rotary cutter head, for instance moving the casting ladle to and fro in longitudinal direction, the complete cylindrical inner wall of the casting ladle can be cleaned. The cutter head can have a number of, preferably exchangeable, teeth on its cylindrical body. By also arranging cutter teeth on the cutter face, the bottom of the casting ladle can be scraped off.

The teeth on the cylindrical body of the cutter head are preferably arranged in a V-shaped pattern, the top of the V being in the direction of rotation of the cutter body.

Not only in casting ladles of the type described above, but in tubes, pipes and the like arises the problem of removing hard material encrusted on the inner wall. For example, in putting piles in place, use is made of a tube which is driven into the ground, in which tube concrete is poured and subsequently the tube is removed, leaving behind the concrete. In such concrete pouring tubes an extremely hard layer of concrete residues and mortar is formed. So far it has been tried to clean such tubes by handling their inner walls with scrapers, blasting tools, and the like. This seems to produce hardly any effect in actual practice, it appears at any rate to be so time-consuming and hence expensive that it is often preferred to replace the tubes.

According to the invention these problems can be avoided by not scraping off, blasting or drilling these hard deposits but choosing a milling operation therefor.

In such concrete pouring tubes use can in principle be made of an apparatus which is characterized by a rotary cutter head slidable through the tube to be cleaned by means of an extendable shaft and by centering means positioned behind the cutter head for keeping at least the last part of the drive shaft adjacent to the cutter head in the centre of the tube.

In order to avoid removal of tube material in unround tubes by the cutter, the cutter head according to the invention can also be provided with circumferentially spaced, radial cutter holders, the cutters of which project radially with adjustable bias.

To compensate as well for local out of roundness of the tube, the cutter head according to the invention may have directly behind it a sleeve axially fixed and freely rotating about the drive shaft, said sleeve having at least three axially projecting, circumferentially spaced jibs for caster wheels radially extending therefrom with adjustable spring bias.

In practice it is preferable to arrange two or more sets of at least three caster wheels each in axially spaced relationship on the sleeve.

To advance the cutter head rotatingly, use can be made, according to the invention, of a motor mounted on a trolley which is movable on rails, said trolley being movable in the direction of impact by a piston, the cylinder of which is connected to a fluid buffer vessel under pneumatic pressure. Pneumatic drive for performing an axial stroke of the piston moving the trolley is attractive, as it is possible thereby to cause the piston and consequently the trolley to perform the in-stroke rapidly. However, the drawback of exclusively a pneumatic drive is that if the cutter tool encounters an obstruction in the tube to be cleaned, on account of the compressibility of the compressed air, the continuity of the uniform piston movement and hence of the milling movement is not ensured. By making use of a fluid buffer vessel in the manner described above this drawback is obviated.

The invention will now be described with reference to the drawings showing some embodiments of container cleaning devices, by way of example.

Figure 1:
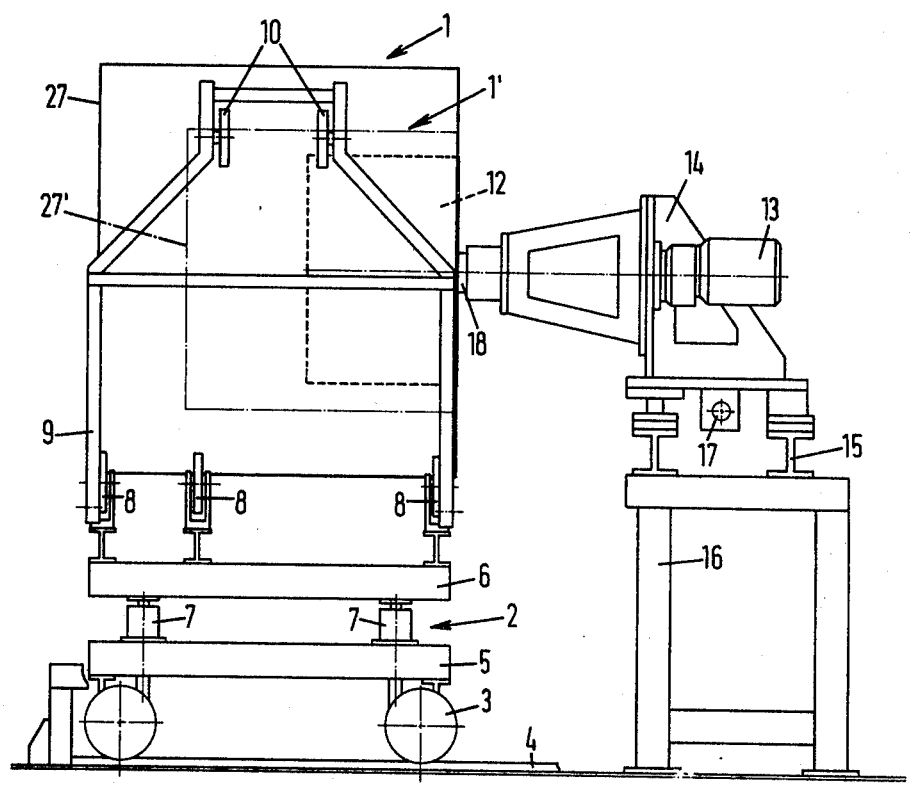
FIG. 1 is a side elevational view of an apparatus for cleaning a casting ladle.
Figure 2:
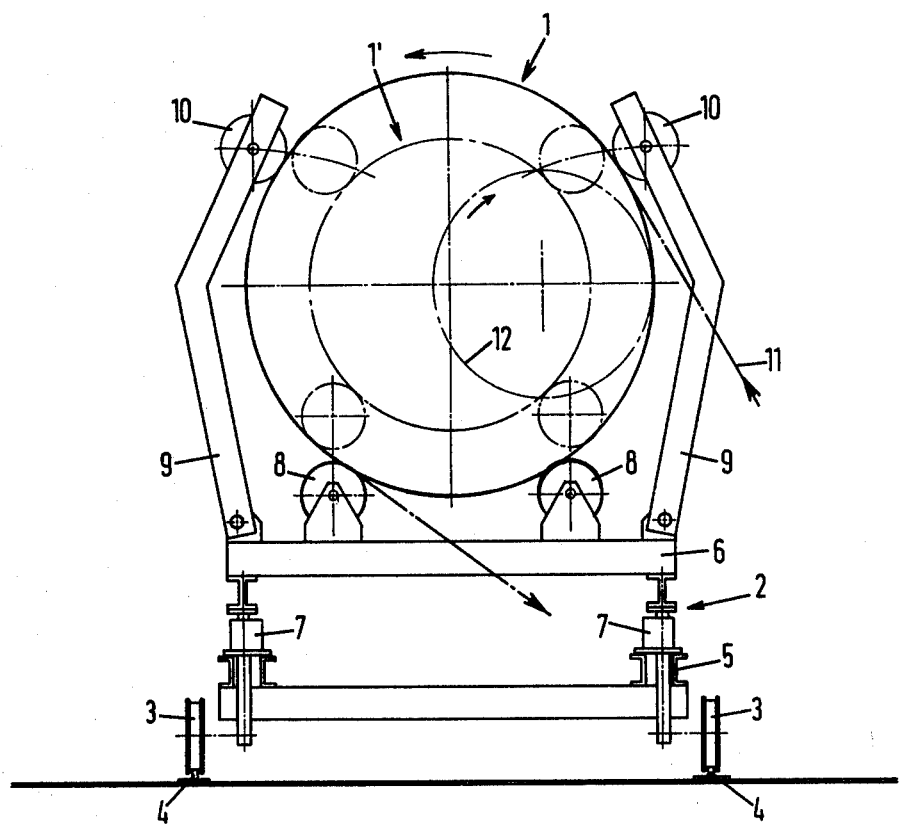
FIG. 2 is an end view of the apparatus shown in FIG. 1.
Figure 3:
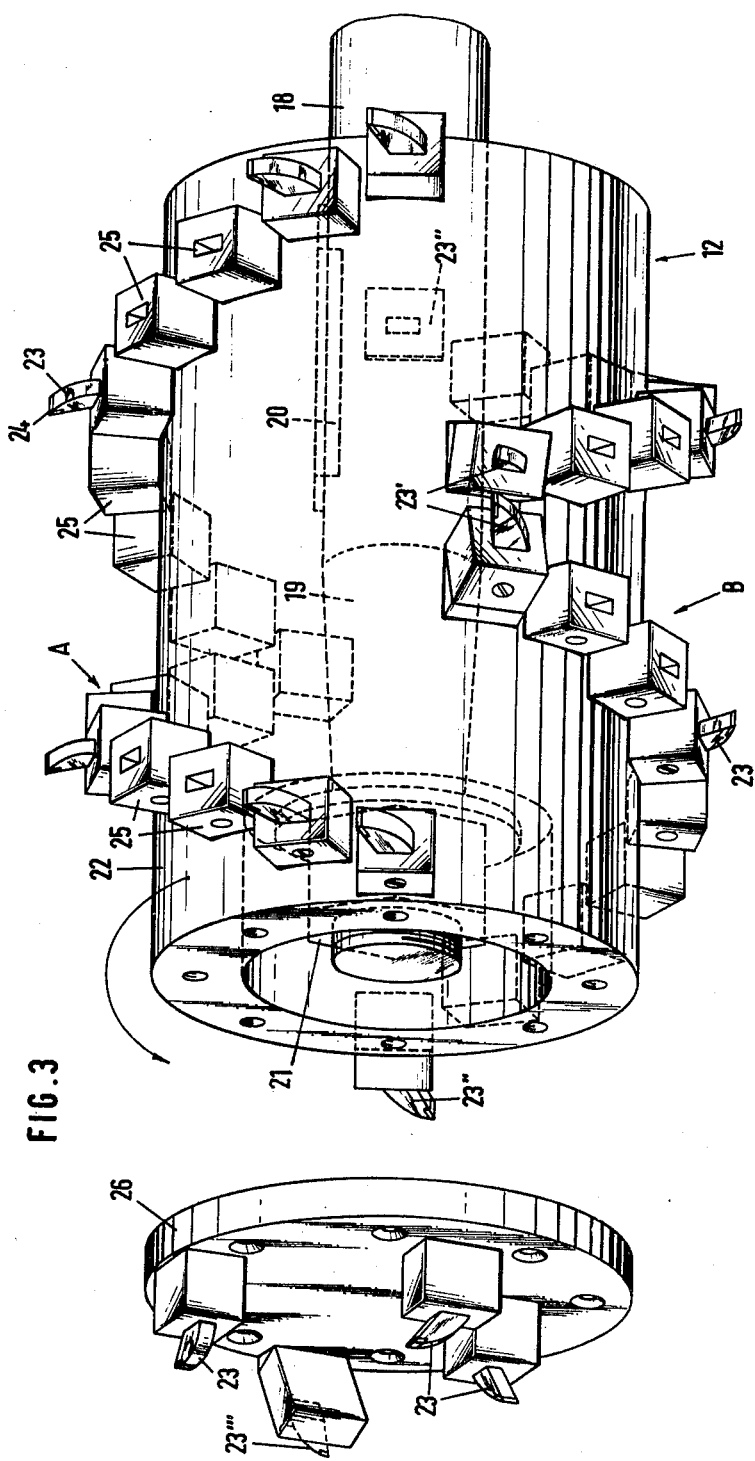
FIG. 3 is a diagrammatic perspective view of the cutter head used in the apparatus shown in FIGS. 1 and 2.

In the drawings, in particular FIGS. 1-3, an apparatus for cleaning a casting ladle 1 comprises a trolley 2, which is movable in longitudinal direction with wheels 3 on rails 4. Trolley 2 includes a base 5 and a platform 6 with jacks 7 in between, with which the platform is adjustable in height, to adapt the apparatus to the cleaning of casting ladles of various dimensions. The drawings show the contours of a relatively large casting ladle 1 and of a casting ladle having a relatively smaller diameter 1'.

Platform 6 includes a number of freely rotating support rollers 8, while pivotable arms 9 include freely rotating arresting rollers 10. Casting ladle 1 is clamped between the sets of rollers 8 and 10 while being horizontally rotatable about its axis. A drive cable 11 is shown schematically. However, it will be clear that any desired way of rotational drive can be applied. The position of support rollers 8 and of arresting rollers 10 is shown in dotted lines for rotary support of the smaller casting ladle 1'. In depicting casting ladles 1 and 1' the thickness of the ladle wall, nor of the refractory lining has been taken into account.

A cutter head 12 is mounted with a drive motor 13 on a bracket 14 movable in transverse direction of rails 15 on a stand 16 by means of a transverse drive 17 of any desired type, for example in the form of a threaded rod.

Before entering into the operation of the apparatus, the preferred construction of the cutter head 12 will be described in detail with reference to FIG. 3.

On drive shaft 18 with a conical part 19 is mounted a cylindrical body 22 by means of a key 20 and a fastening nut 21. The cylindrical body 22 comprises a number of tooth-shaped cutters 23 arranged in a V-shaped pattern. Cutters 23 are of a commercially available type, having a carbide tip 24 and being exchangeably mounted in cutter holders 25 secured to the surface of cylinder 22. For the sake of simplicity only a limited number of cutters 23 is shown, while cutter holders 25 are shown only diagrammatically. The cutters are arranged in two V-shaped series, generally indicated by A and B. In series A all cutters are arranged with their tips in the direction of rotation, indicated by arrow F. Of series B the two leading cutters, indicated by 23', are arranged to be inclined toward each other, and the last two cutters of series B, the holders of which are indicated by reference numeral 23", are outwardly inclined with respect to the direction of rotation, so that the paths of the tips of the respective cutters 23" extend beyond surface 22 of the cylinder.

On the end face of cylinder 22 opposite to drive shaft 18 is mounted a head plate 26 with a pattern of cutters 23 covering the end face, the marginal cutter being indicated by 23''' and being also inclined outwardly.

The apparatus operates as follows.

As shown in FIGS. 1 and 2, cutter head 12 is laterally adjustable, but vertically fixed in this embodiment. The support for the casting ladle 1, 1' is adjustable in height by means of jacks 7, to adapt the casting ladle diameter to the position of cutter head 12. As the casting ladle is rotating, a side portion of the inner wall is contacted with the rotary cutter head 12. The cutter head has a diameter greater than half the diameter of the casting ladle to be cleaned, so that end face 26 can scrape off the bottom 27, 27' of casting ladle 1, 1', respectively, without it being necessary to move the cutter head in transverse direction with respect to the casting ladle axis. The cutter head is kept urged against a side portion of the inner wall of the casting ladle. To urge the cutter head against a portion which is higher than the horizontal plane through the casting ladle axis is disadvantageous in that this would force the casting ladle from support rollers 8, while urging the cutter head against a portion of the inner wall of the casting ladle adjacent the lowest point is disadvantageous in that this would cause the cutter head 12 to move in the accumulating mass of scrapings. Of course, some variation in height is possible. As the casting ladle and cutter head rotate in opposite directions, it is possible to effect longitudinal movement of the casting ladle on rails 4 by means of trolley 2, so that, with stationary cutter 12, the cutter covers the whole depth of the casting ladle. It will be clear that various modifications are possible. For example, cutter 12 can be height-adjustable and other drives of the casting ladle and also other ways of support can be chosen.

Figure 4:
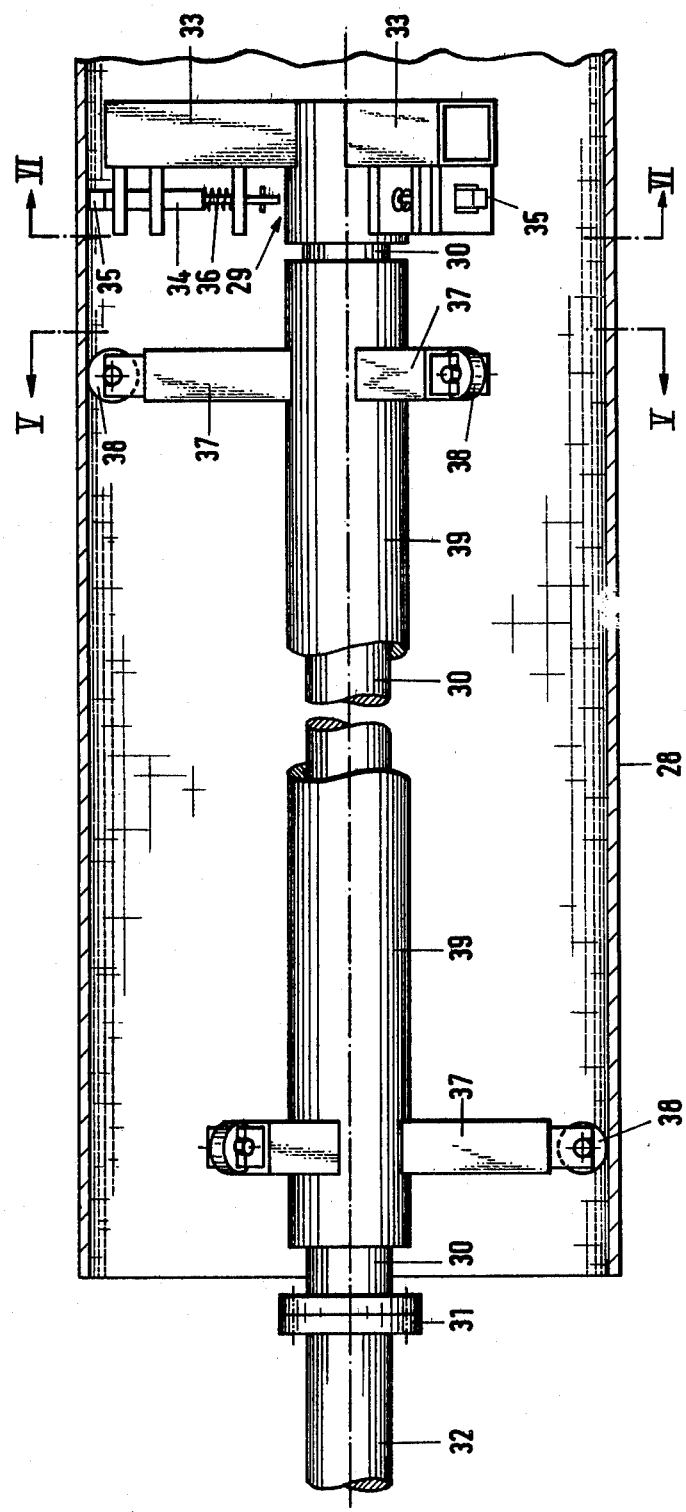
FIG. 4 is a side elevational view in detail, partly in cross-section, of an apparatus for cleaning tubes.
Figure 5:
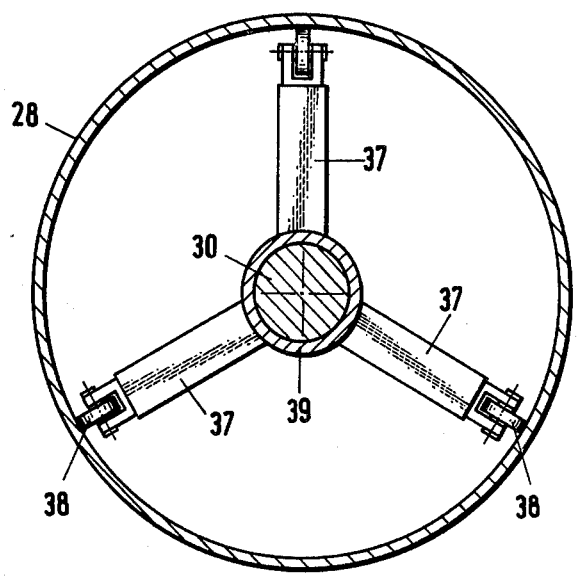
FIG. 5 is a sectional view on the line V—V in FIG. 4
Figure 6:
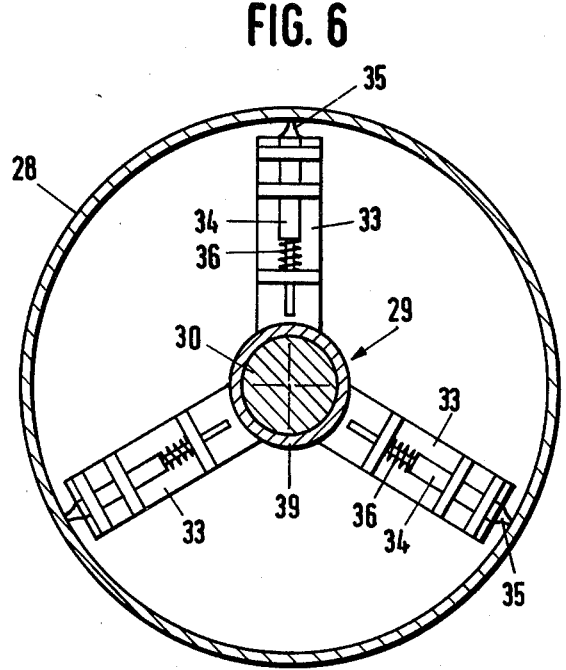
FIG. 6 is a sectional view on the line VI—VI in FIG. 4.

Referring to FIGS. 4, 5 and 6, the cutter device adapted to cleaning tubes will now be described.

A tube 28, for example used in pouring concrete piles in the ground, collects cement, concrete and the like on the inner wall after some time in the form of an extremely hard layer, not shown in the drawing.

On the basis of the principle underlying the present invention, this layer can be milled off with milling and boring tools generally indicated by reference numeral 29. Cutting tool 29 is mounted on a drive shaft 30, to which extension tubes 32 can be connected by means of a coupling 31. Cutting tool 29 comprises three circumferentially spaced cutter holders 33, from which cutters 34 with their carbide tips 35 extend radially. The cutters are biased by a spring 36, which can be compressed to a greater or lesser extent by means of washers (not shown).

For guiding tool 29 through tube 28 there is provided a guide (FIG. 5) directly behind the tool, said guide comprising two sets of three circumferentially spaced jibs 37 in which radially outwardly biased bearings are accommodated for caster wheels 38 by means of compression springs. The sets of jibs 37 with caster wheels 38 are mounted on a sleeve 39 which is mounted to be axially fixed, but freely rotating about drive shaft 30. Therefore, caster wheels 38 ensure that at least the last part of drive shaft 30, 32, directly preceding tool 29, remains axially centered, while the springing constructions of wheels 38 and also of cutters 34, 35 ensure that in the case of local unroundness of the tube, tool 29 remains centered and cutters 34, 35 do not penetrate into the material of tube 28.

It will be clear that the invention is not limited to the fields of application described above, i.e. casting ladle cleaning, tube cleaning, but is in principle applicable in all cases where hard material must be removed from the inner surface of a hollow article with a certain degree of accuracy, without damaging the material of the article itself.

I claim:

1. An apparatus for cleaning a cylindrical hollow casting ladle or similar container comprising means for rotating the container about the axis thereof, a rotatable cutter head transversally adjustable with respect to the container, said cutter head having an end face and a cylindrical body of a diameter smaller than the diameter of the container, but greater than the radius of the container, said cutter head including a number of teeth on said face and on the cylindrical body thereof, and means for performing a relative axial movement between the container and said cutter head to introduce said cutter head into said container.

2. The apparatus of claim 1, wherein the teeth on the end face of the cutter head lie within the periphery of said body.

* * * * *